(12) United States Patent
Whitaker

(10) Patent No.: US 7,523,605 B2
(45) Date of Patent: Apr. 28, 2009

(54) AIR FILTER FOR A TAIL PIPE

(76) Inventor: Corey D. Whitaker, P.O. Box 507, Marble Falls, TX (US) 78654

( * ) Notice: Subject to any disclaimer, the term of this patent is extended or adjusted under 35 U.S.C. 154(b) by 517 days.

(21) Appl. No.: 11/254,256

(22) Filed: Oct. 19, 2005

(65) Prior Publication Data

US 2007/0084199 A1    Apr. 19, 2007

(51) Int. Cl.
*F01N 3/00* (2006.01)
(52) U.S. Cl. .............. 60/297; 60/311; 55/DIG. 30
(58) Field of Classification Search .............. 60/297, 60/311; 55/DIG. 30
See application file for complete search history.

(56) References Cited

U.S. PATENT DOCUMENTS

| | | | |
|---|---|---|---|
| 1,858,637 A | | 5/1932 | McDonald |
| 2,620,893 A | * | 12/1952 | Rountree et al. ............ 55/476 |
| 3,083,084 A | | 3/1963 | Raymond |
| 3,224,171 A | * | 12/1965 | Bowman ................. 96/418 |
| 3,406,501 A | * | 10/1968 | Watkins ................... 96/135 |
| 3,548,591 A | | 12/1970 | McKay |
| 3,675,398 A | * | 7/1972 | Giarrizzo ................. 96/132 |
| 3,757,892 A | * | 9/1973 | Raudman, Jr. ............ 181/256 |
| 3,869,267 A | * | 3/1975 | Gaylor ................... 55/492 |
| 4,183,896 A | | 1/1980 | Gordon |
| 4,184,858 A | | 1/1980 | Walker |
| 4,578,091 A | * | 3/1986 | Borja ..................... 95/214 |
| 4,706,455 A | * | 11/1987 | Johnsson ................. 60/311 |
| 5,135,551 A | * | 8/1992 | Fielding .................. 96/279 |
| 5,407,456 A | | 4/1995 | Tseng |
| 5,509,947 A | * | 4/1996 | Burton ................... 96/383 |
| D394,236 S | * | 5/1998 | Verlengiere ............. D12/194 |
| 5,979,159 A | | 11/1999 | Adamczyk et al. |
| 6,334,459 B1 | | 1/2002 | Berger |
| 6,926,824 B2 | * | 8/2005 | Wang ..................... 210/222 |

* cited by examiner

*Primary Examiner*—Thomas E Denion
*Assistant Examiner*—Diem Tran

(57) ABSTRACT

A filter includes a cylindrical foramenous core which is removably mounted inside the exit end of an exhaust pipe of a vehicle powered by an internal combustion engine. Engine exhaust gases flow through the core before being exhausted into the atmosphere and are cleaned of undesirable products such as Carbon Monoxide as well as undesirable particulate matter and the like. The core is easily removed from the exhaust pipe for cleaning, replacement or the like.

6 Claims, 2 Drawing Sheets

AIR FILTER FOR A TAIL PIPE

BACKGROUND OF THE INVENTION

1. Field of the Invention

The present invention relates to devices for removing pollutants from internal combustion engine emissions and in particular to an air-pollutant separator for removing pollutants from the exhaust and other engine sources of emission.

2. Background of the Invention

At present, exhaust fumes from the engine of a vehicle flow through an exhaust pipe and through a muffler to be exhausted. As exhaust fumes generally contain a large amount of incompletely burned gasoline and carbon monoxide, which is toxic to human bodies, laws are enacted to limit toxic gas emission to protect human health and the environment.

The continuing effort to develop ways and means of reducing the pollution from internal combustion engines is well known. This effort continues on at least two broad fronts. On the one hand, there is modification of engine operation or replacement with a different type of power source. On the other hand, there are efforts to develop accessories for use with internal combustion engines with and without accompanying engine modifications, both at the intake and exhaust sides of the engine to prevent the engine from creating one or the other of the undesirable types of emissions and to trap and entrain the pollutants emitted by the engine prior to the discharge of the exhaust from the engine to the atmosphere.

Illustrative of such accessories are the catalytic converters which are being utilized in the exhaust system of internal combustion engines. The palladium catalyst used by the converters is a prime factor in requiring engines to be modified so that they can operate on non-leaded fuels. The use of leaded fuels quickly "poison" the palladium catalyst utilized in such converters, thereby quickly rendering them ineffective. The positive crankcase ventilation (PCV) system for reducing pollution due to crankcase emissions including the PCV and valve converter is another example of such engine accessories Therefore, there is a need for an accessory for use with a vehicle powered by an internal combustion engine that can effectively and efficiently clean undesirable products from the exhaust gases associated with those vehicles.

Because vehicle emission gases change over time, due to changes in engine design or engine use, as well as results desired, any accessory associated with the engine should be easy to change. Therefore, there is a need for an accessory for use with a vehicle powered by an internal combustion engine that can effectively and efficiently clean undesirable products from the exhaust gases associated with those vehicles yet is easy to remove and replace so it is easily and efficiently changed to meet changing requirements associated with the engine.

Still further, in order to be most acceptable and to achieve the most success, any such accessory should be inexpensive to encourage the widest possible use thereof. In this regard, there is a need for an accessory for use with a vehicle powered by an internal combustion engine that can effectively and efficiently clean undesirable products from the exhaust gases associated with those vehicles yet will be inexpensive to purchase, remove and replace.

INVENTION SUMMARY

These, and other, objects are achieved by a filter unit that includes a cylindrical foramenous core. The unit mounts on the gas exit end of an exhaust pipe that is associated with a motor vehicle that is powered by an internal combustion engine. A mounting unit of the filter unit includes a ring that fits around the outside of the exhaust pipe and is attached to the exhaust pipe by a ring.

Using the filter embodying the present invention will permit a user to quickly and easily place, remove and replace the core, and hence a filter element to meet changing conditions associated with the vehicle as well as changing conditions associated with the filter unit itself. In this manner, should the filter unit have the effectiveness thereof reduced, as by exhaustion of its filtering capacity through use or damage, the unit can be easily and quickly replaced. Still further, should conditions of the exhaust gases themselves change or the requirements associated with the character of the gases being exhausted into the atmosphere change (as by changes in the laws associated with vehicle exhaust, or the like), the filter unit embodying the present invention can be easily and quickly changed.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE INVENTION

Figure 1:
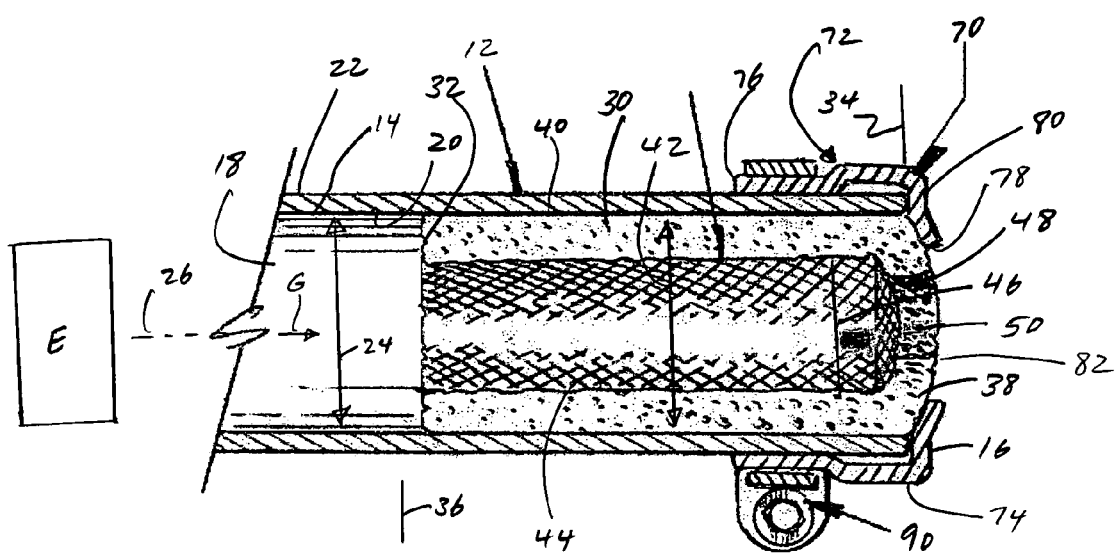
FIG. 1 is a cutaway view of a filter for removing undesirable products from gases being exhausted from an internal combustion engine.

FIG. 1 shows a filter unit 10 including a gas flow pipe 12 associated with an internal combustion engine E being used to provide power to a motor vehicle, such as a land vehicle or the like. The engine and vehicle will not be discussed because they are well known to those skilled in the art and the particulars of these elements are not important to the present invention. Pipe 12 includes a cylindrical wall 14 having a gas exit end 16 and a bore 18. Bore 18 fluidically connects gas exit end 16 to internal combustion engine E for conducting gases G generated by the internal combustion engine during operation thereof away from the internal combustion engine. Gas flow pipe 12 has an interior surface 20 located adjacent to bore 18 and an exterior surface 22. Bore 18 has an internal diameter 24 defined by interior surface 20 of the gas flow pipe. Gas flow pipe 12 also has a longitudinal axis 26.

Figure 2:
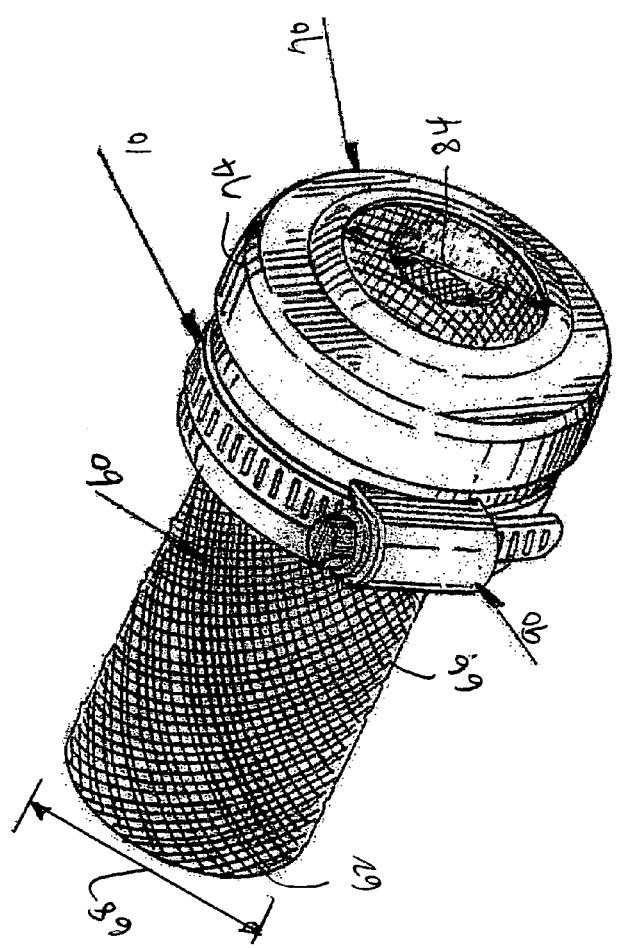
FIG. 2 is a perspective view of the filter.

A tubular filter element 30 is located inside the gas flow pipe adjacent to gas exit end 16. Element 30 includes a first end 32 which is an inlet end when filter element 30 is in place in the gas flow pipe as shown in FIG. 2. First end 32 is planar and is spaced apart in the direction of the internal combustion engine from a plane 34 containing gas exit end 16 of gas flow pipe 12. First end 32 is contained in a plane 36 that is parallel with plane 34 containing the gas exit end.

Element 30 further includes a second end 38 which is an outlet end when the filter element is in place in the gas flow pipe. Second end 38 is located closely adjacent to plane 34. second end 38 is arcuate and extends out of gas exit end 16 of the gas flow pipe when the filter element is in place in the gas flow pipe as can be understood from FIG. 2.

An outer surface 40 on element 30 connects the first and second ends of tubular filter element 30. Outer surface 40 of the filter element has an outer diameter 42 which is slightly smaller than internal diameter 24 defined by the interior surface of gas flow pipe 12 and is sized so tubular filter element 30 fits snugly inside bore 18 of the gas flow pipe when in use.

A cylindrical bore 44 is defined in element 30 and extends between the first and second ends of tubular filter element 30. Cylindrical bore 44 of the filter element has an internal diameter 46. A gas exhaust port 48 is defined in second end 38 of the tubular filter element to be in fluid communication with cylindrical bore 44 of the tubular filter element to fluidically connect cylindrical bore 44 to the environment surrounding the gas flow pipe. Gas exhaust port 48 has an internal diameter 50 which is smaller than internal diameter 46 of cylindrical bore 44 of filter element 30.

A mounting unit 70 mounts filter element 30 on gas flow pipe 12. Unit 70 includes a cap 72 mounted on exterior surface 22 of gas flow pipe 12. Cap 72 has a cylindrical body 74 which has a first end 76 and a second end 78. Body 74 of the cap extends past second end 16 of gas flow pipe 12 and portion 80 of body 74 of the cap adjacent to second end 78 of the body extends toward longitudinal axis 26 of the gas flow pipe and has a shape which is arcuate and which matches the arcuate shape of second end 38 of filter element 30.

A gas exhaust port 82 is defined in second end 78 of body 74 of the cap. Gas exhaust port 82 of the cap has a diameter 84 which is smaller than internal diameter 24 of gas flow pipe 12 and larger than internal diameter 46 of bore 44 of filter element 30. Second end 78 of body 74 of cap 72 snugly engages second end 38 of filter element 30 to securely hold the filter element in place in the gas flow pipe. A clamp element 90 surrounds body 74 of the cap adjacent to first end 76 of the body of the cap. Clamp element 90 is adjustable and securely holds mounting unit 70 on the gas flow pipe.

The filter element 30 may be made from a variety of materials to filter out the carbon monoxide from the exhaust gases such mesh fiber and the outer surface 40 may be wrapped with wire mesh. As such, exhaust gases flowing from engine E will thus pass through filter element 30 and be filtered before exiting gas pipe 12 and then to the environment. The filter element 30 can be easily installed within the gas flow pipe 12 so that filter element cannot be seen. In addition, with the filter element 30 inside the gas flow pipe 12, exhaust gases are filtered as the gases flow pass through the length of the filter element 30 such that the exhaust gases are filtered in an effective and efficient manner and operation of the engine will not be unduly affected by the presence of a filter element in the exhaust port of the gas pipe.

Figure 3:
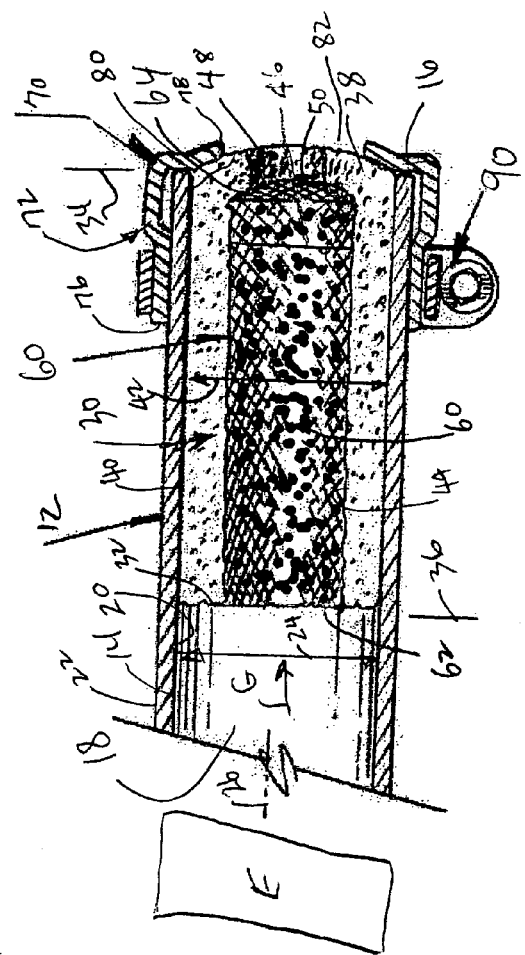
FIG. 3 is a cutaway view of the filter shown in FIG. 2.

FIGS. 2 and 3 show that a foramenous cylindrical filter element core 60 may be also provided inside cylindrical bore 44 of tubular filter element 30. Core 60 includes a first end 62 which is planar and which is coplanar with plane 24 containing first end 32 of filter element 30. Core 60 further includes a second end 64 which is arcuate and which is located adjacent to second end 38 of filter element 30. Second end 64 of the filter element core tapers and extends in a direction from the filter element core toward the gas exit end of gas flow pipe 12 and is located entirely inside bore 18 of gas flow pipe 12 so cylindrical filter element core 60 is entirely located inside bore 18 of gas flow pipe 12. It is noted that the taper of second end 64 controls flow of gas so the exhaust gas will be filtered while gas flow from engine E is not unduly impeded.

A cylindrical wall 66 connects the first and second ends of filter element core 60 and has an external diameter 68 which is slightly smaller than internal diameter 46 of the cylindrical bore 44 of tubular filter element 30 so filter element core 60 fits snugly inside the cylindrical bore of tubular filter element 30. External diameter 68 of the cylindrical wall of the filter core element is greater than internal diameter 50 of gas exhaust port 48 of filter element 30 with arcuate second end 64 of the filter element core extending into gas exhaust port 48 of filter element 30. The filter element core 60 may be made from mesh fiber to further filter the exhaust gases flowing through the gas flow pipe 12, along with the filter element 30.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. A filter unit comprising:
A) a gas flow pipe associated with an internal combustion engine being used to provide power to a motor vehicle, the pipe including a cylindrical wall having a gas exit end and a bore, the bore fluidically connecting the gas exit end to the internal combustion engine for conducting gases generated by the internal combustion engine during operation thereof away from the internal combustion engine, said gas flow pipe having an interior surface located adjacent to the bore, and an exterior surface, the bore having an internal diameter defined by the interior surface of said gas flow pipe, said gas flow pipe having a longitudinal axis;
B) a tubular filter element located in the gas flow pipe adjacent to the gas exit end thereof and including
(1) a first end which is an inlet end when said filter element is in place in the gas flow pipe, the first end being planar and spaced apart in the direction of the internal combustion engine from a plane containing the gas exit end of the gas flow pipe, the first end being contained in a plane that is parallel with the plane containing the gas exit end,
(2) a second end which is an outlet end when said filter element is in place in the gas flow pipe, the second end being located closely adjacent to the plane containing the gas exit end of the gas flow pipe, the second end being arcuate and extending out of the gas exit end of the gas flow pipe when said filter element is in place in the gas flow pipe,
(3) an outer surface connecting the first and second ends of said tubular filter element, the outer surface of said filter element having an outer diameter, the outer diameter of the outer surface of said tubular filter element being slightly smaller than the internal diameter defined by the interior surface of said gas flow pipe and being sized so said tubular filter element fits snugly inside the bore of said gas flow pipe when in use,
(4) a cylindrical bore which extends between the first and second ends of said tubular filter element, the cylindrical bore of said filter element having an internal diameter, and
(5) a gas exhaust port defined in the second end of said tubular filter element to be in fluid communication with the cylindrical bore of said tubular filter element to fluidically connect the cylindrical bore of said filter element to the environment surrounding said gas flow pipe, the gas exhaust port of said filter element having an internal diameter which is smaller than the internal diameter of the cylindrical bore of said filter element;
C) a cylindrical filter element core mounted inside the cylindrical bore of said tubular filter element and including
   (1) a first end which is planar and which is coplanar with the plane containing the first end of said filter element,
   (2) a second end which is arcuate and which is located adjacent to the second end of said filter element, the second end of said filter element core tapering and extending in a direction from the filter element core toward the gas exit end of said gas flow pipe and being located entirely inside the bore of said gas flow pipe so said cylindrical filter element core is entirely located inside the bore of said gas flow pipe and
   (3) a cylindrical wall connecting the first and second ends of said filter element core, the cylindrical wall of said filter element core having an external diameter which is slightly smaller than the internal diameter of the cylindrical bore of said tubular filter element so said filter element core fits snugly inside the cylindrical bore of said tubular filter element, the external diameter of the cylindrical wall of said filter core element being greater than the internal diameter of the gas exhaust port of said filter element with the arcuate second end of the filter element core extending into the gas exhaust port of said filter element; and
D) a mounting unit which mounts said filter element on said gas flow pipe and which includes
   (1) a cap mounted on the exterior surface of said gas flow pipe and having
      (a) a cylindrical body with a first end and a second end, the body of the cap extending past the second end of said gas flow pipe and the body of the cap adjacent to the second end of the body extending toward the longitudinal axis of said gas flow pipe and having a shape which is arcuate and which matches the arcuate shape of the second end of said filter element, and
      (b) a gas exhaust port defined in the second end of the body of the cap, the gas exhaust port of the cap having a diameter which is smaller than the internal diameter of said gas flow pipe and larger than the internal diameter of the bore of said filter element, the second end of the body of said cap snugly engaging the second end of said filter element to securely hold said filter element in place in said gas flow pipe, and
   (2) a clamp element surrounding the body of the cap adjacent to the first end of the body of the cap, the clamp element securely holding said mounting unit on said gas flow pipe.

2. A filter unit for use on a gas flow pipe associated with an internal combustion engine being used to provide power to a motor vehicle comprising:
A) a tubular filter element located within the gas flow pipe adjacent to an exit end of the gas flow pipe, and including
   (1) a first end which is an inlet end when said filter element is in place in the gas flow pipe,
   (2) a second end which is an outlet end when said filter element is in place in the gas flow pipe,
   (3) a cylindrical bore which extends between the first and second ends of said tubular filter element, the cylindrical bore of said filter element having an internal diameter, and
   (4) a gas exhaust port defined in the second end of said tubular filter element to be in fluid communication with the cylindrical bore of said tubular filter element to fluidically connect the cylindrical bore of said filter element to the environment surrounding the gas flow pipe, the gas exhaust port of said filter element having an internal diameter which is smaller than the internal diameter of the cylindrical bore of said filter element;
B) a mounting unit which mounts said filter element on the gas flow pipe and which includes
   (1) a cap mounted on the exterior surface of said gas flow pipe and having
      (a) a cylindrical body with a first end and a second end, the body of the cap extending past the second end of the gas flow pipe and the body of the cap adjacent to the second end of the body extending toward the longitudinal axis of the gas flow pipe and having a shape which is arcuate and which matches the arcuate shape of the second end of said filter element, and
      (b) a gas exhaust port defined in the second end of the body of the cap, the gas exhaust port of the cap having a diameter which is smaller than an internal diameter of the gas flow pipe and larger than the internal diameter of the bore of said filter element, the second end of the body of said cap snugly engaging the second end of said filter element to securely hold said filter element in place in the gas flow pipe, and
   (2) a clamp element surrounding the body of the cap securely holding said mounting unit on the gas flow pipe; and
C) a cylindrical filter element core mounted inside the cylindrical bore of said tubular filter element the cylindrical filter element having
   (1) a first end,
   (2) a second end which is arcuate and which is located adjacent to the second end of said filter element, the second end of said filter element core tapering and extending in a direction toward the exit end of the gas flow pipe and being located entirely inside the gas flow pipe so said cylindrical filter element core is entirely located inside the gas flow pipe, and
   (3) a cylindrical wall connecting the first and second ends of said filter element core, the cylindrical wall of said filter element core having an external diameter which is slightly smaller than the internal diameter of the cylindrical bore of said tubular filter element so said filter element core fits snugly inside the cylindrical bore of said tubular filter element, the external diameter of the cylindrical wall of said filter core element being greater than the internal diameter of the gas exhaust port of said filter element with the arcuate second end of the filter element core extending into the gas exhaust port of said filter element.

3. The filter unit according to claim 2, where the filter element is made of mesh of fibers.

4. A filter unit for use on a gas flow pipe associated wit an internal combustion engine being used to provide power to a motor vehicle comprising:
A) a tubular filter element located within the gas flow pipe adjacent to an exit end of the gas flow pipe, and including
   (1) a first end which is an inlet end when said filter element is in place in the gas flow pipe,
   (2) a second end which is an outlet end when said filter element is in place in the gas flow pipe, (3) a cylindrical bore which extends between the first and second ends of said tubular filter element, the cylindrical bore of said filter element having an internal diameter, and (4) a gas exhaust port defined in the second end of said tubular filter element to be in fluid communication with the cylindrical bore of said tubular filter element to fluidically connect the cylindrical bore of said filter element to the environment surrounding the gas flow pipe, the gas exhaust port of said filter element having an internal diameter which is smaller than the internal diameter of the cylindrical bore of said filter element;

B) means for attaching the tubular filter element within the gas flow pipe and adjacent to the outlet of the gas flow pipe; and C) a cylindrical filter element core mounted inside the cylindrical bore of said tubular filter element, the cylindrical filter element having (1) a first end, (2) a second end which is arcuate and which is located adjacent to the second end of said filter element, the second end of said filter element core tapering and extending in a direction toward the exit end of the aas flow pipe and being located entirely inside the gas flow pipe so said cylindrical filter element core is entirely located inside the gas flow pipe, and (3) a cylindrical wall connecting the first and second ends of said filter element core, the cylindrical wall of said filter element core having an external diameter which is slightly smaller than the internal diameter of the cylindrical bore of said tubular filter element so said filter eiement core fits snugly inside the cylindrical bore of said tubular filter element, the external diameter of the cylindrical wall of said filter core element being greater than the internal diameter of the gas exhaust port of said filter element with the arcuate second end of the filter element core extending into the gas exhaust port of said filter element.

5. The filter unit according to claim 4, where the means for attaching the tubular filter to the gas flow pipe is a mounting unit which includes (1) a cap mounted on the exterior surface of said gas flow pipe and having (a) a cylindrical body with a first end and a second end, the body of the cap extending past the second end of the gas flow pipe and the body of the cap adjacent to the second end of the body extending toward the longitudinal axis of the gas flow pipe and having a shape which is arcuate and which matches the arcuate shape of the second end of said filter element, and (b) a gas exhaust port defined in the second end of the body of the cap, the gas exhaust port of the cap having a diameter which is smaller than an internal diameter of the gas flow pipe and larger than the internal diameter of the bore of said filter element the second end of the body of said filter cap snugly engaging the second end of said filter element to securely hold said filter element in place in the gas flow pipe, and (2) a clamp element surrounding the body of the cap securely holding said mounting unit on the gas flow pipe.

6. The filter unit according to claim 4, where the filter element is made of mesh of fibers.

* * * * *